(12) United States Patent
Matsumoto (10) Patent No.: US 9,886,738 B2
(45) Date of Patent: Feb. 6, 2018

(54) DATA PROCESSING APPARATUS AND DATA PROCESSING METHOD

(71) Applicant: FUJI XEROX CO., LTD., Tokyo (JP)

(72) Inventor: Daisuke Matsumoto, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 195 days.

(21) Appl. No.: 15/047,687

(22) Filed: Feb. 19, 2016

(65) Prior Publication Data

US 2017/0083996 A1 Mar. 23, 2017

(30) Foreign Application Priority Data

Sep. 18, 2015 (JP) .................. 2015-184720

(51) Int. Cl.
*G06T 1/20* (2006.01)
*G06F 9/46* (2006.01)

(52) U.S. Cl.
CPC . *G06T 1/20* (2013.01); *G06F 9/46* (2013.01)

(58) Field of Classification Search
CPC ......... G06T 15/005; G06T 1/20; G06T 15/04; G09G 5/363; G06F 3/14
See application file for complete search history.

(56) References Cited

U.S. PATENT DOCUMENTS

2009/0094494 A1* 4/2009 Takeshima ............. G11C 29/18
714/719
2009/0327655 A1* 12/2009 Yoshikawa ........... G06F 9/3879
712/42

FOREIGN PATENT DOCUMENTS

JP 05-143720 A 6/1993
JP 09-319863 A 12/1997

* cited by examiner

*Primary Examiner* — Todd Buttram
(74) *Attorney, Agent, or Firm* — Sughrue Mion, PLLC (57) ABSTRACT

A data processing apparatus includes a circuit selector and a data processor. The circuit selector makes a selection, in data processing in which multiple unit processes are each selected and repeated, from a generalized circuit that executes the multiple unit processes and one of dedicated circuits that are each dedicated to a corresponding one of the unit processes, the selection being made repeatedly on a basis of a judgment made using continuous repeat counts each of which indicates how many times a corresponding one of the unit processes is continuously repeated. The data processor selectively configures one of the generalized circuit and the dedicated circuit that corresponds to one of results serially obtained from the selection repeatedly made by the circuit selector, the data processor performing the data processing.

10 Claims, 9 Drawing Sheets

DATA PROCESSING APPARATUS AND DATA PROCESSING METHOD

CROSS-REFERENCE TO RELATED APPLICATIONS

This application is based on and claims priority under 35 USC 119 from Japanese Patent Application No. 2015-184720 filed Sep. 18, 2015.

BACKGROUND (i) Technical Field

The present invention relates to a data processing apparatus and a data processing method.

(ii) Related Art

Data processing apparatuses have been widely used in various fields, and in particular, image processing apparatuses that process image data are a specific example of the data processing apparatuses.

Programmable devices such as programmable logic devices (PLDs) and field programmable gate arrays (FPGAs) that enable reconfiguration of an internal circuit configuration have been widely used. General PLDs and FPGAs configure internal logic circuits when the circuits are activated; however, programmable devices capable of changing the logic circuit configuration while circuits are active have been developed. In particular, dynamically reconfigurable processors (DRPs) capable of dynamically changing the internal logic circuit configuration have been increasingly used. For example, the use of the dynamic reconfiguration eliminates the need to physically change or add a circuit as hardware and enables change of the internal configuration of the reconfigurable circuit, and data processing appropriate for input data may thus be performed.

SUMMARY

According to an aspect of the invention, there is provided a data processing apparatus including a circuit selector and a data processor. The circuit selector makes a selection, in data processing in which multiple unit processes are each selected and repeated, from a generalized circuit that executes the multiple unit processes and one of dedicated circuits that are each dedicated to a corresponding one of the unit processes, the selection being made repeatedly on a basis of a judgment made using continuous repeat counts each of which indicates how many times a corresponding one of the unit processes is continuously repeated. The data processor selectively configures one of the generalized circuit and the dedicated circuit that corresponds to one of results serially obtained from the selection repeatedly made by the circuit selector, the data processor performing the data processing.

BRIEF DESCRIPTION OF THE DRAWINGS

An exemplary embodiment of the present invention will be described in detail based on the following figures, wherein.

DETAILED DESCRIPTION

Figure 1:
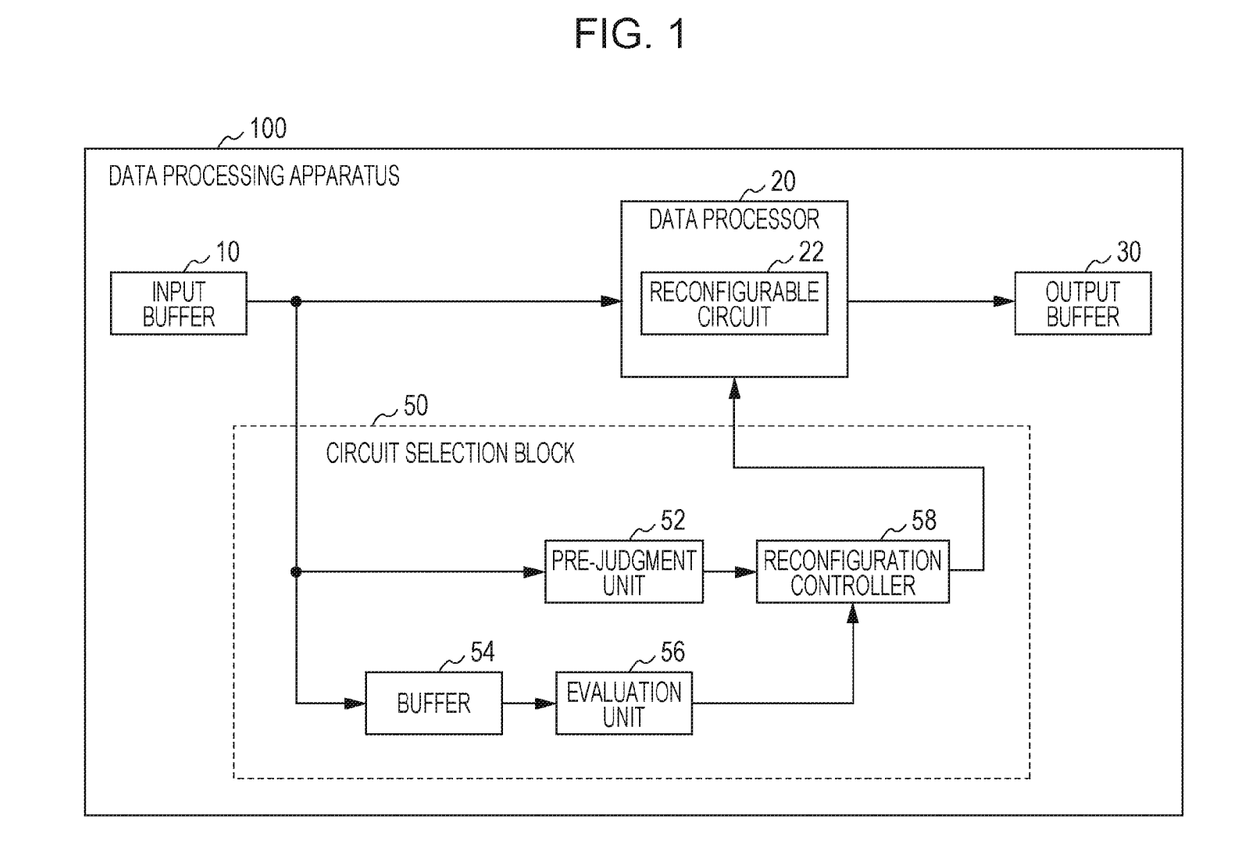
FIG. 1 is a diagram illustrating a specific example of a data processing apparatus of an exemplary embodiment of the invention.

FIG. 1 is a diagram illustrating a specific example of a data processing apparatus 100 of an exemplary embodiment of the invention. In FIG. 1, the data processing apparatus 100 includes a data processor 20 that performs data processing on target data (data to be processed). Specific examples of the target data include image data (including data only containing text, numerals, or symbols). For example, image data obtained from an external apparatus such as a computer and stored in an input buffer 10 undergoes data processing (image processing) performed by the data processor 20. The image data processed by the data processor 20 is stored in an output buffer 30.

The data processing apparatus 100 in FIG. 1 may be incorporated in an image processing apparatus having an image reading function (scanning function) or the like, and image data obtained from a medium such as paper through the image reading function may be processed. It goes without saying that an image corresponding to image data processed by the data processing apparatus 100 may be printed on a medium such as paper. Specific examples of the image processing apparatus using the data processing apparatus 100 include a copier, a printer, and a facsimile (FAX) machine. Further, a multifunction printer having two or more functions of a copier, a printer, and a facsimile machine is also a specific example of the image processing apparatus. Further, an image processing system including the data processing apparatus 100 and an external apparatus may be constructed. In the image processing system, the external apparatus is provided with image data processed by the data processing apparatus 100 and prints an image corresponding to the image data on a medium such as paper.

The data processor 20 includes a reconfigurable circuit 22. The reconfigurable circuit 22 performs data processing on target data by using a reconfigurable (programmable) circuit configuration. Specific examples of the reconfigurable circuit 22 include a dynamic reconfigurable processor (DRP).

The data processor 20 performs data processing in which multiple unit processes are each selected and repeated. The data processor 20 performs, for example, data processing in which data processing A and data processing B are each selected and repeated multiple times. Multiple processing commands for target data are associated with the respective unit processes, for example, the data processing A and the data processing B, and the data processor 20 serially makes selections from, for example, the data processing A and the data processing B in accordance with the respective processing commands.

If the target data is image data, graphic processing and image processing are respectively performed on a graphic portion and an image portion in the image data. Graphics include text, figures, and the like, and a data format composed of, for example, pixel values and a run length is used for the graphic portion in the image data. Images include an image, gradation, and the like, and a data format composed of SrcImage, an enlargement ratio, and the like is used for the image portion in the image data.

As the reconfigurable circuit 22 included in the data processor 20, a generalized circuit that enables multiple unit processes to be executed or a dedicated circuit for executing one of the unit processes is configured. Note that the unit processes include not only the processes (command processes) associated with the respective processing commands but also processes such as a process for processing continuous pieces of data (continuous data processing) and a process for processing noncontinuous pieces of data (noncontinuous data processing), the processes being discriminated on the basis of what the processing target data is like (such as data continuity) (see FIG. 9).

Figure 2:
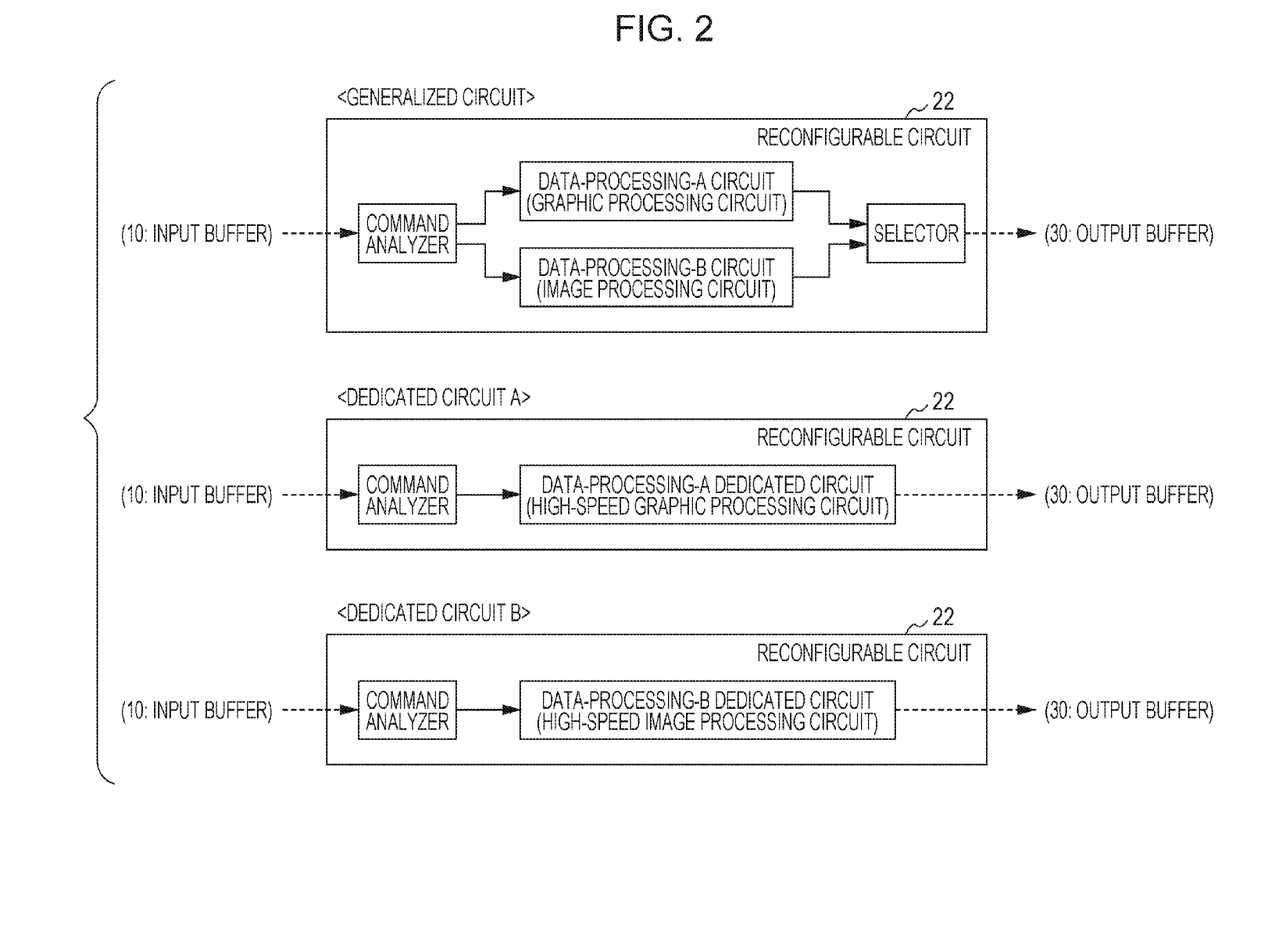
FIG. 2 is a diagram illustrating circuit configuration examples of a reconfigurable circuit.

FIG. 2 is a diagram illustrating circuit configuration examples of the reconfigurable circuit 22. FIG. 2 illustrates example circuits configured in a case where the data processing A and the data processing B are performed on target data. When the target data is image data, specific examples of the data processing A and the data processing B are respectively graphic processing and image processing.

The generalized circuit has a circuit configuration that enables both the data processing A (graphic processing) and the data processing B (image processing). The reconfigurable circuit 22 includes a data-processing-A circuit (graphic processing circuit) and a data-processing-B circuit (image processing circuit) and further includes a command analyzer and a selector. Note that the command analyzer and the selector may be provided outside the reconfigurable circuit 22.

The command analyzer serially analyzes multiple processing commands for the target data (image data) obtained from the input buffer 10 and selects one of data processing circuits for the corresponding unit process associated with the corresponding processing command, that is, the data-processing-A circuit or the data-processing-B circuit. For example, if the target data is image data, data for a graphic portion in the image data has been associated with a graphic processing command. The data for the graphic portion is transmitted to the graphic processing circuit and undergoes graphic processing. In contrast, data for an image portion in the image data has been associated with an image processing command. The data for the image portion is transmitted to the image processing circuit and undergoes image processing.

The selector outputs, to the output buffer 30, data obtained as a result of the corresponding process from the data processing circuit selected in accordance with the corresponding processing command. For example, consider a case where the target data is image data. If the graphic processing circuit is selected, the selector transmits, to the output buffer 30, data obtained as a result of the graphic processing from the graphic processing circuit. If the image processing circuit is selected, the selector transmits, to the output buffer 30, data obtained as a result of the image processing from the image processing circuit.

A dedicated circuit A is a dedicated circuit for the data processing A (graphic processing). The dedicated circuit A includes a data-processing-A dedicated circuit (high-speed graphic processing circuit) and a command analyzer and is configured in the reconfigurable circuit 22. Note that the command analyzer may be provided outside the reconfigurable circuit 22.

The command analyzer serially analyzes the multiple processing commands for the target data (image data) obtained from the input buffer 10 and transmits the target data to the data-processing-A dedicated circuit. For example, if the target data is image data, data for a graphic portion in the image data has been associated with the graphic processing command. The data for the graphic portion is transmitted to the high-speed graphic processing circuit and undergoes the graphic processing. Data obtained as a result of the graphic processing from the high-speed graphic processing circuit is transmitted to the output buffer 30.

In comparison with the circuit configuration of the generalized circuit, the circuit configuration of the dedicated circuit A does not need the data-processing-B circuit, and the reconfigurable circuit 22 thus has free space corresponding to the data-processing-B circuit. Accordingly, the circuit space is utilized to configure a high-processing-performance dedicated circuit for the dedicated circuit A. For example, the data-processing-A dedicated circuit (high-speed graphic processing circuit) of the dedicated circuit A may perform processing faster than the data-processing-A circuit (graphic processing circuit) of the generalized circuit. Note that the reconfigurable circuit 22 configured as the generalized circuit may be entirely reconfigured as the dedicated circuit A or partially reconfigured as the dedicated circuit A with part of the configuration of the reconfigurable circuit 22 maintained.

A dedicated circuit B is a dedicated circuit for the data processing B (image processing). The dedicated circuit B includes a data-processing-B dedicated circuit (high-speed image processing circuit) and a command analyzer and is configured in the reconfigurable circuit 22. Note that the command analyzer may be provided outside the reconfigurable circuit 22.

The command analyzer serially analyzes the multiple processing commands for the target data (image data) obtained from the input buffer 10 and transmits the target data to the data-processing-B dedicated circuit. For example, if the target data is image data, data for an image portion in the image data has been associated with the image processing command. The data for the image portion is transmitted to the high-speed image processing circuit and undergoes the image processing. Data obtained as a result of the image processing from the high-speed image processing circuit is transmitted to the output buffer 30.

In comparison with the circuit configuration of the generalized circuit, the circuit configuration of the dedicated circuit B does not need the data-processing-A circuit, and the reconfigurable circuit 22 thus has free space corresponding to the data-processing-A circuit. Accordingly, the circuit space is utilized to configure a high-processing-performance dedicated circuit for the dedicated circuit B. For example, the data-processing-B dedicated circuit (high-speed image processing circuit) of the dedicated circuit B may perform processing faster than the data-processing-B circuit (image processing circuit) of the generalized circuit. Note that the reconfigurable circuit 22 configured as the generalized circuit may be entirely reconfigured as the dedicated circuit B or partially reconfigured as the dedicated circuit B with part of the configuration of the reconfigurable circuit 22 maintained.

Although FIG. 2 illustrates the graphic processing and the image processing as the specific examples of the data processing A and the data processing B, another image processing such as Jpeg compression/expansion or pattern matching and data processing such as Huffman compression/expansion may be used as the data processing A and the data processing B. In addition, data processing C, D, and . . . may also be added to the data processing A and the data processing B to configure the dedicated and generalized circuits for three or more types of data processing.

Referring back to FIG. 1, a circuit selection block 50 selects the circuit configuration of the reconfigurable circuit 22, that is, selects the generalized circuit or one of the dedicated circuits (dedicated circuit A or B in FIG. 2). Hereinafter, specific examples of processes executed by the data processing apparatus 100 in FIG. 1 will be described in detail. In the following description, the components (denoted by reference numerals) as in FIG. 1 are denoted by the same reference numerals as in FIG. 1.

FIGS. 3 to 6 are flowcharts illustrating the specific examples of the processes executed by the data processing apparatus 100.

Figure 3:
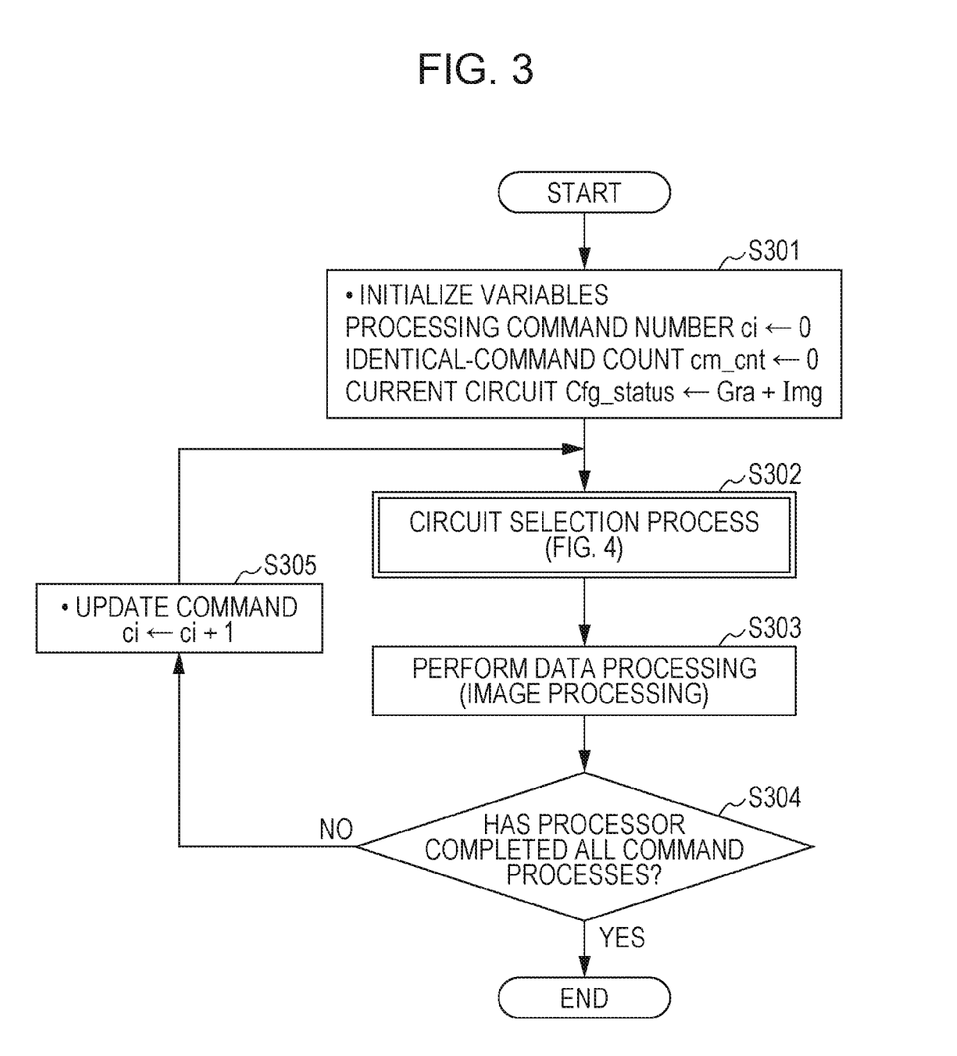
FIG. 3 is a flowchart illustrating an overall process executed by the data processing apparatus.

FIG. 3 is a flowchart illustrating an overall process executed by the data processing apparatus 100. When target data (image data) is input to the input buffer 10, the process illustrated in FIG. 3 is started, and various variables used in later steps are initialized (S301). For example, a processing command number ci, an identical-command count cm_cnt obtained by counting identical processing commands that are continuously repeated, and a current circuit Cfg_status are respectively initialized to 0 (zero), 0 (zero), and Gra+Img denoting a generalized circuit.

The circuit selection block 50 executes a circuit selection process and selects a circuit to be configured in the reconfigurable circuit 22 (S302). Specifically, the circuit selection block 50 selects the generalized circuit or one of the dedicated circuits (dedicated circuit A or B in FIG. 2). The circuit selection process executed by the circuit selection block 50 will be described later in detail (see FIG. 4).

Subsequently, the data processor 20 configures, in the reconfigurable circuit 22, the circuit selected by the circuit selection block 50 and performs data processing (image processing) on target data (image data) obtained from the input buffer 10 (S303). The target data (image data) having undergone the processing is output to the output buffer 30.

It is checked whether the data processor 20 has completed all of command processes for the target data (S304). For example, if the target data is image data, it is checked whether the data processor 20 has completed all of command processes for the target data in one page. If the data processor 20 has not completed all of command processes for the target data, the processing command number ci is incremented by 1 (S305), and steps S302 and S303 are executed for the next processing command. Steps S302 and S303 are repeated until all of the command processes are completed. If the data processor 20 has completed all of command processes for the target data, the process illustrated in FIG. 3 is terminated.

Figure 4:
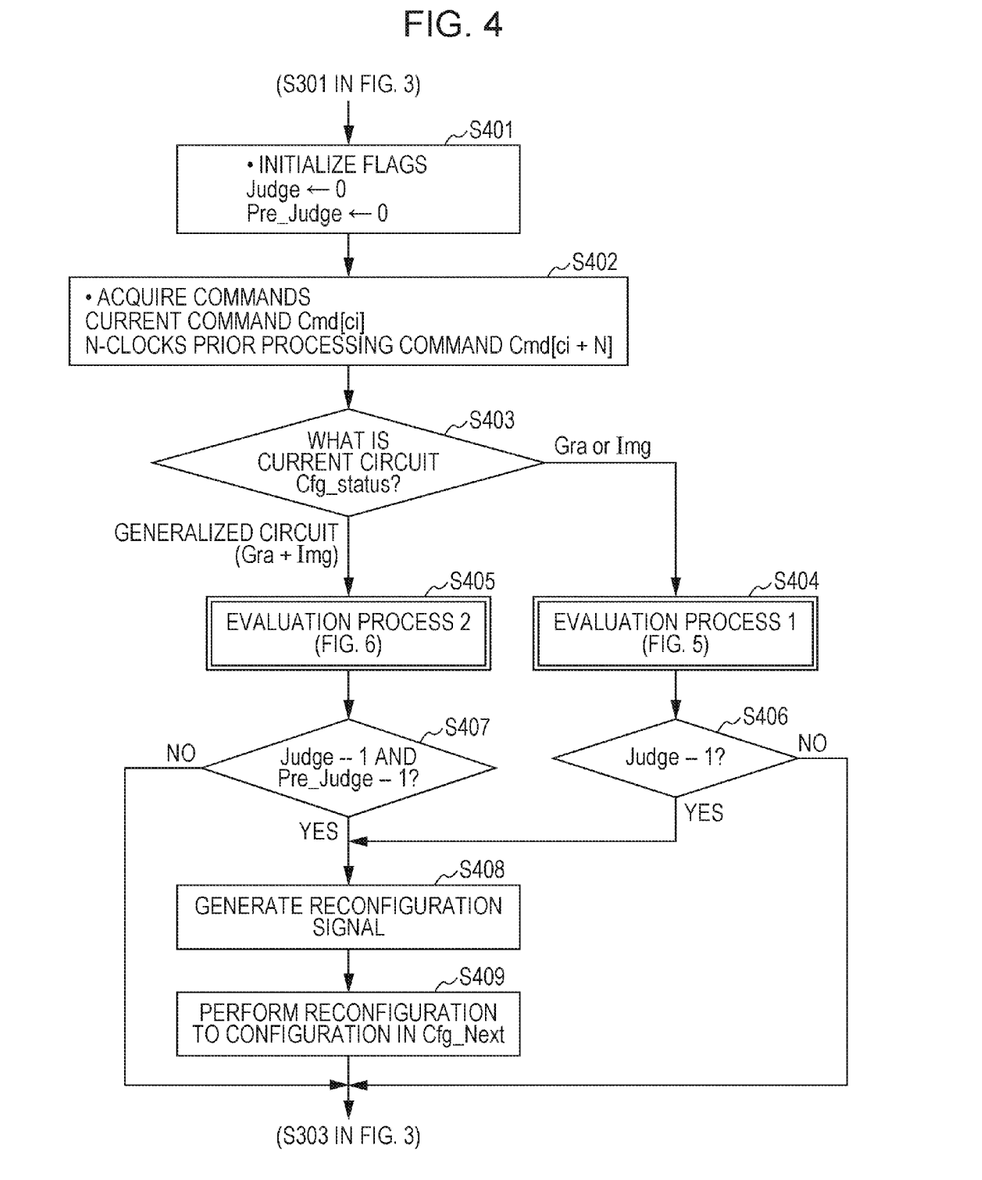
FIG. 4 is a flowchart illustrating a circuit selection process executed by a circuit selection block.

FIG. 4 is a flowchart illustrating the circuit selection process executed by the circuit selection block 50. Specifically, FIG. 4 illustrates a specific example of the circuit selection process in step S302 in FIG. 3. When the process illustrated in FIG. 4 is started, various flags used in later steps are first initialized (S401). For example, as illustrated in FIG. 4, a flag Judge and a flag Pre_Judge are both initialized to 0 (zero).

Subsequently, a current processing command Cmd[ci] and an N-clocks prior processing command Cmd[ci+N] that has been issued N clocks earlier than the current processing command Cmd[ci] are acquired (S402). For example, target data (image data) having an amount obtained within N clocks has been transmitted from the input buffer 10 to a buffer 54 prior to data processing (image processing) to be performed by the data processor 20, and an evaluation unit 56 acquires the current processing command Cmd[ci] and the N-clocks prior processing command Cmd[ci+N] on the basis of the target data (image data) stored in the buffer 54. N is a natural number. N may take on a fixed value or may be appropriately corrected (may undergo fine adjustment) by, for example, a user.

Subsequently, the current circuit Cfg_status is checked (S403). If the current circuit is a dedicated circuit (Gra or Img), the process proceeds to step S404. If the current circuit is the generalized circuit (Gra+Img), the process proceeds to step S405. Incidentally, the current circuit Cfg_status has been initialized to the generalized circuit (Gra+Img) in step S301 (FIG. 3).

Figure 5:
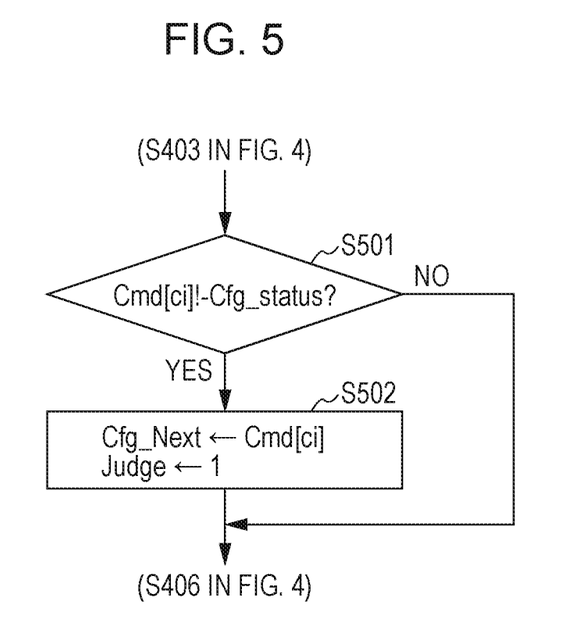
FIG. 5 is a flowchart illustrating an evaluation process 1 for a case where the current circuit is a dedicated circuit.

An evaluation process 1 for a case where the current circuit is the dedicated circuit (Gra or Img) is executed (S404). A specific example of the evaluation process 1 will be described later in detail (FIG. 5). The flag Judge to be changed or maintained in the evaluation process 1 is checked (S406). If the flag Judge is 1, a reconfiguration controller 58 generates a reconfiguration signal (S408), and the reconfigurable circuit 22 is reconfigured to have a circuit configuration designated using a next circuit Cfg_Next (S409). If the flag Judge is 0 (zero), the reconfiguration is not performed, and the process illustrated in FIG. 4 is terminated.

Figure 6:
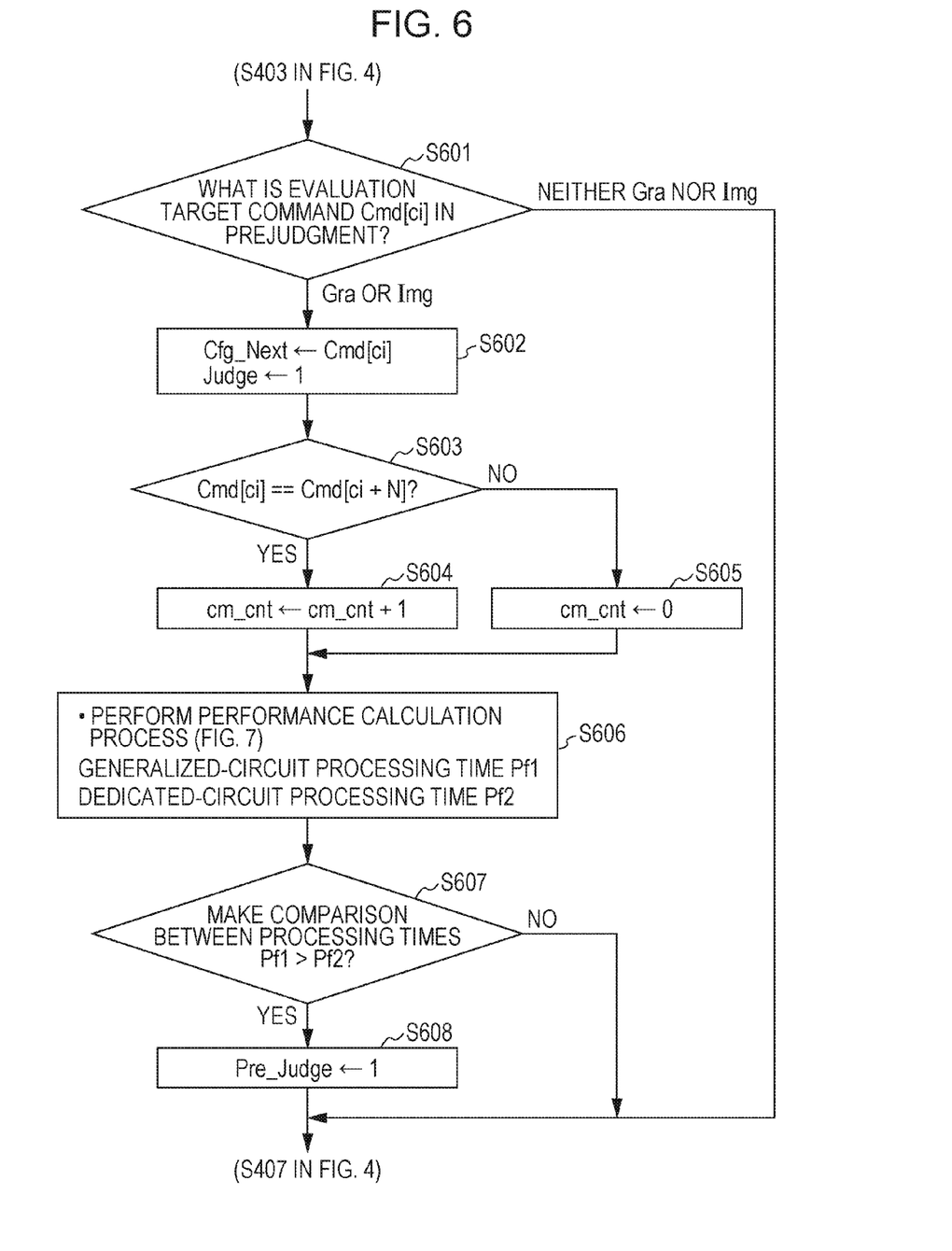
FIG. 6 is a flowchart illustrating an evaluation process 2 for a case where the current circuit is a generalized circuit.

In contrast, an evaluation process 2 for a case where the current circuit is the generalized circuit (Gra+Img) is executed (S405). A specific example of the evaluation process 2 will be described later in detail (FIG. 6). The flag Judge and the flag Pre_Judge to be changed or maintained in the evaluation process 2 are checked (S407). If each of the flag Judge and the flag Pre_Judge is 1, the reconfiguration controller 58 generates a reconfiguration signal (S408), and the reconfigurable circuit 22 is reconfigured to have the circuit configuration designated using the next circuit Cfg_Next (S409). If at least one of the flag Judge and the flag Pre_Judge is 0 (zero), the reconfiguration is not performed, and the process illustrated in FIG. 4 is terminated.

FIG. 5 is a flowchart illustrating the evaluation process 1 for a case where the current circuit is a dedicated circuit. In the evaluation process 1 in FIG. 5, it is first checked whether the current circuit Cfg_status corresponds to the current processing command Cmd[ci] (S501). Specifically, it is checked whether the currently configured circuit is a dedicated circuit corresponding to the current processing command.

If the current circuit Cfg_status does not correspond to the current processing command Cmd[ci], that is, if the currently configured circuit is not a dedicated circuit corresponding to the current processing command, the next circuit Cfg_Next is changed to the dedicated circuit corresponding to the current processing command Cmd[ci], and the flag Judge is further changed to 1 (S502). The process illustrated in FIG. 5 is terminated.

In contrast, if the current circuit Cfg_status corresponds to the current processing command Cmd[ci], that is, the currently configured circuit is the dedicated circuit corresponding to the current processing command, the next circuit Cfg_Next and the flag Judge are maintained, and the process illustrated in FIG. 5 is terminated. Note that steps S501 and S502 in FIG. 5 are executed by, for example, a pre-judgment unit 52.

FIG. 6 is a flowchart illustrating the evaluation process 2 for a case where the current circuit is a generalized circuit. In the evaluation process 2 in FIG. 6, it is first checked whether the current processing command Cmd[ci] is a command for processing to be evaluated (S601). In the specific example in FIG. 6, graphic processing (Gra) and image processing (Img) are to be evaluated. Accordingly, if the current processing command Cmd[ci] is neither a command for the graphic processing (Gra) nor for the image processing (Img), steps S602 to S608 are not executed, and the process illustrated in FIG. 6 is terminated. Note that the data processor 20 also includes circuits for other processes in addition to those for the graphic processing (Gra) and the image processing (Img), and each of the other processes is executed in the corresponding circuit.

If the current processing command Cmd[ci] is the graphic processing (Gra) or the image processing (Img), the next circuit Cfg_Next is changed to a dedicated circuit corresponding to the current processing command Cmd[ci], and the flag Judge is changed to 1 (S602).

The current processing command Cmd[ci] is compared with the N-clocks prior processing command Cmd[ci+N] (S603). If the current processing command Cmd[ci] matches the N-clocks prior processing command Cmd[ci+N], the identical-command count cm_cnt is incremented by 1 (S604). If the current processing command Cmd[ci] does not match the N-clocks prior processing command Cmd[ci+N], the identical-command count cm_cnt is set to 0 (zero) (S605).

Subsequently, a performance calculation process is executed. A generalized-circuit processing time Pf1 and a dedicated-circuit processing time Pf2 are calculated (S606). A specific example of the performance calculation process will be described later in detail (FIG. 7).

The generalized-circuit processing time Pf1 is compared with the dedicated-circuit processing time Pf2 (S607). If the processing time Pf1 is longer than the processing time Pf2 (if Pf1>Pf2 holds true), the flag Pre_Judge is changed to 1 (S608). If the processing time Pf1 is not longer than the processing time Pf2 (if Pf1>Pf2 does not hold true), the flag Pre_Judge is maintained, and the process illustrated in FIG. 6 is terminated.

Note that steps S601 and S602 in FIG. 6 are executed by, for example, the pre-judgment unit 52, and steps S603 to S608 in FIG. 6 are executed by, for example, the evaluation unit 56.

Figure 7:
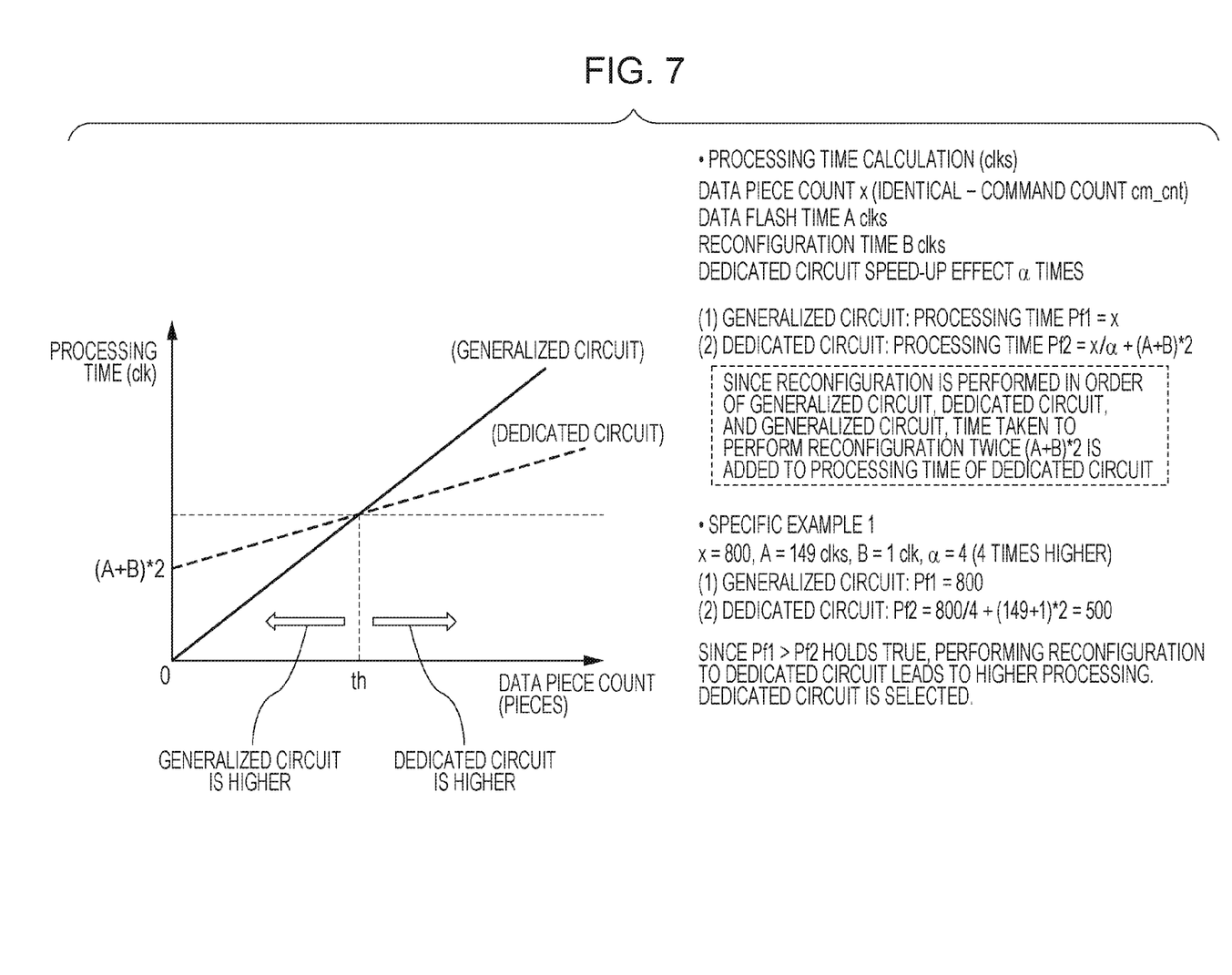
FIG. 7 illustrates a graph for explaining a specific example of a performance calculation process.

FIG. 7 illustrates a graph for explaining the specific example of the performance calculation process. FIG. 7 illustrates a processing time calculation example as a performance calculation example. A processing time is calculated by using a data piece count x (pieces), a data flash time A (clks: clocks), a reconfiguration time B (clks: clocks), and a speed-up effect α of a dedicated circuit (times: how many times faster a dedicated circuit is than a generalized circuit).

The data piece count x is a count of pieces of data used in a continuously repeated unit process. The data piece count x is, for example, a count of continuous pieces of data that are to undergo the graphic processing (Gra) or the image processing (Img). The identical-command count cm_cnt in the specific processes described with reference to FIGS. 3 to 6 is equivalent to the data piece count x.

The data flash time A is obtained by adding a pipeline configuration time to a data evacuation time, the pipeline configuration time being taken until input data reaches a dedicated circuit (for example, the data-processing-A dedicated circuit A or the data-processing-B dedicated circuit in FIG. 2), the data evacuation time being taken until data to be output is cleared from the dedicated circuit.

The reconfiguration time B is a time taken to change (reconfigure) the circuit in the reconfigurable circuit 22. The speed-up effect α is calculated on the basis of a normal process time and a dedicated process time, the normal process time being taken to process target data having the data piece count x by using a generalized circuit, the dedicated process time being taken to process the target data by using a dedicated circuit. The speed-up effect α is calculated as α=(normal process time/dedicated process time).

The data flash time A, the reconfiguration time B, and the speed-up effect α depend on the circuit configuration of the dedicated circuit and the performance of the reconfigurable circuit 22.

The generalized-circuit processing time Pf1 and the dedicated-circuit processing time Pf2 are respectively calculated in accordance with the following formulae. In the formula for the dedicated-circuit processing time Pf2, for example, (A+B)×2 as a time needed to reconfigure a default generalized circuit to a dedicated circuit and to restore to the generalized circuit is added to a processing time of the dedicated circuit.

Generalized-circuit processing time $Pf1=x$

Dedicated-circuit processing time $Pf2=(x/α)+(A+B)×2$

FIG. 7 illustrates a specific example 1 as a calculation example where the data piece count x is 800, the data flash time A is 149 clks, and the reconfiguration time B is 1 clk, the speed-up effect α is 4. In the specific example 1, the generalized-circuit processing time Pf1 is 800 clks, and the dedicated-circuit processing time Pf2 is 500 clks. Accordingly, Pf1>Pf2 holds true in the specific example 1, and performing reconfiguration to the dedicated circuit leads to faster data processing than data processing performed using the generalized circuit. In the specific example 1, the circuit selection block 50 selects the dedicated circuit.

FIG. 7 also illustrates a graph of a processing time (clk) taken to perform processing in each of the generalized circuit and the dedicated circuit. The processing time varies with the data piece count x (pieces). As illustrated in the graph, if the data piece count x is equal to or lower than a threshold th (or is lower than the threshold th), the use of the generalized circuit configuration without performing reconfiguration leads to faster data processing. If the data piece count x is higher than the threshold th (or is equal to or higher than the threshold th), performing the reconfiguration to the dedicated circuit leads to faster data processing. Accordingly, for example, the data piece count x may be compared with the threshold th to select one of the generalized and dedicated circuits that is higher than the other.

Figure 8:
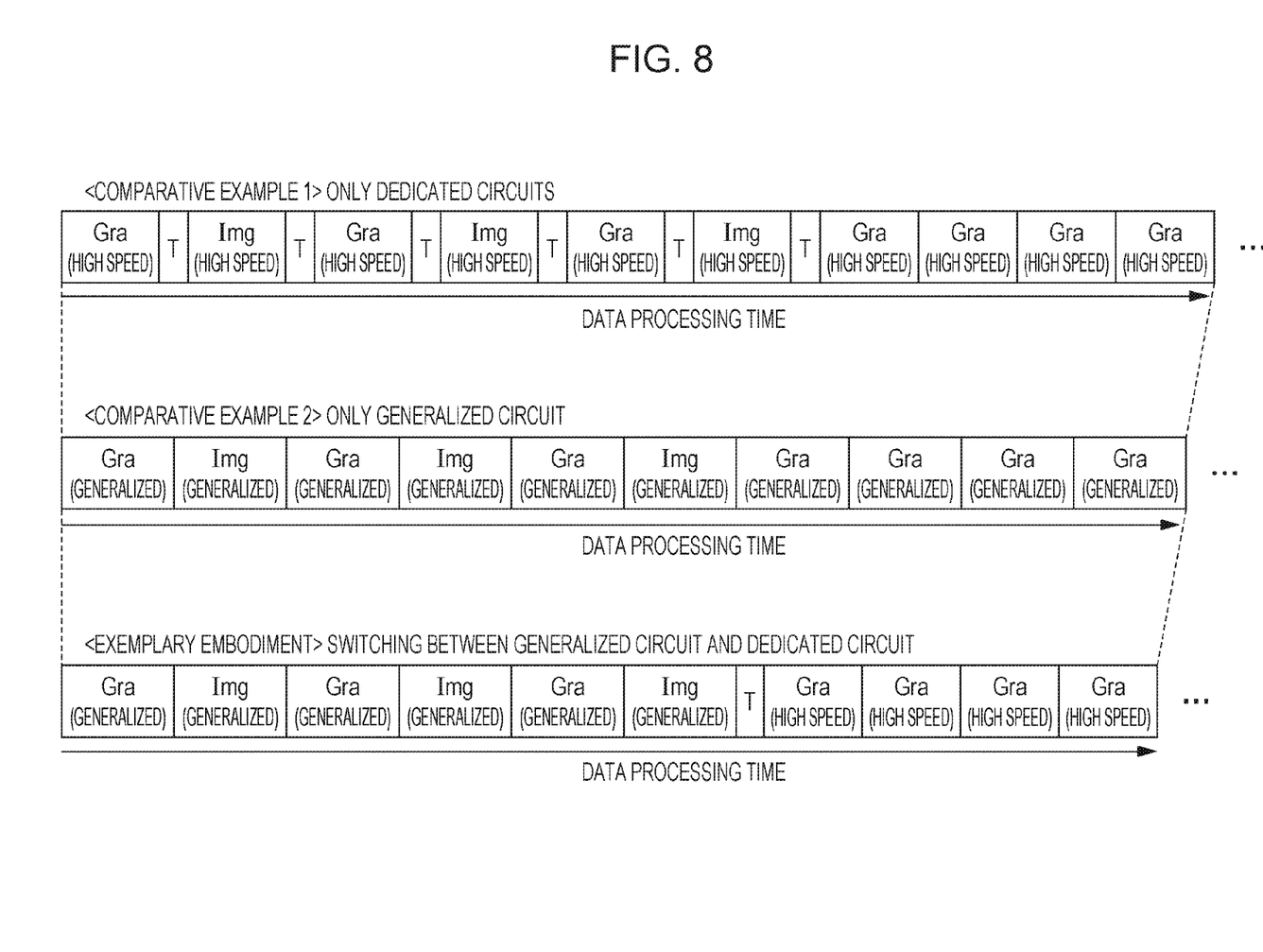
FIG. 8 is a diagram illustrating how data processing in the exemplary embodiment is speeded up.

FIG. 8 is a diagram illustrating how the data processing in the exemplary embodiment (described with reference to FIGS. 1 to 7) is speeded up.

In FIG. 8, data processing in which the graphic processing (Gra) and the image processing (Img) are each selected and repeated is performed in a comparative example 1, a comparative example 2, and a specific example of the exemplary embodiment. Only the dedicated circuits are used in the comparative example 1, only the generalized circuit is used in the comparative example 2, and switching between the generalized circuit and the dedicated circuit is performed in the specific example of the exemplary embodiment. In FIG. 8, a period T is a time needed to perform reconfiguration one time, and, for example, period T=A+B (data flash time A+reconfiguration time B) holds true (see FIG. 7).

The comparative example 1, only the dedicated circuits, that is, the high-speed graphic processing circuit (see FIG. 2) that is the dedicated circuit for the graphic processing and the high-speed image processing circuit that is the dedicated circuit for the image processing (see FIG. 2) are used. Accordingly, in the data processing in which the graphic processing and the image processing are each selected and repeated, reconfiguration for switching between the high-speed graphic processing circuit and the high-speed image processing circuit is needed every time the processing command is changed between the graphic processing and the image processing.

In the comparative example 2, the generalized circuit capable of performing the graphic processing and the image processing is used, and the reconfiguration is not needed when the processing command is changed. Accordingly, the data processing in which the graphic processing and the image processing are each selected and repeated may be performed without performing the reconfiguration. In the specific examples illustrated in FIG. 8, the comparative example 2 exhibits a shorter data processing time than the comparative example 1.

In comparison with the comparative examples 1 and 2, the exemplary embodiment enables appropriately performed switching between the generalized circuit and the dedicated circuit. For example, in a case where the processing command is frequently changed between the graphic processing and the image processing, the generalized circuit is used to reduce the number of times the reconfiguration is performed. In a case where repetition of one of the graphic processing and the image processing is performed more frequently (for a longer time) than the other, reconfiguration to a dedicated circuit for the one processing is performed. As illustrated in FIG. 8, this reduces the data processing time further in the exemplary embodiment than in the comparative example 2.

Figure 9:
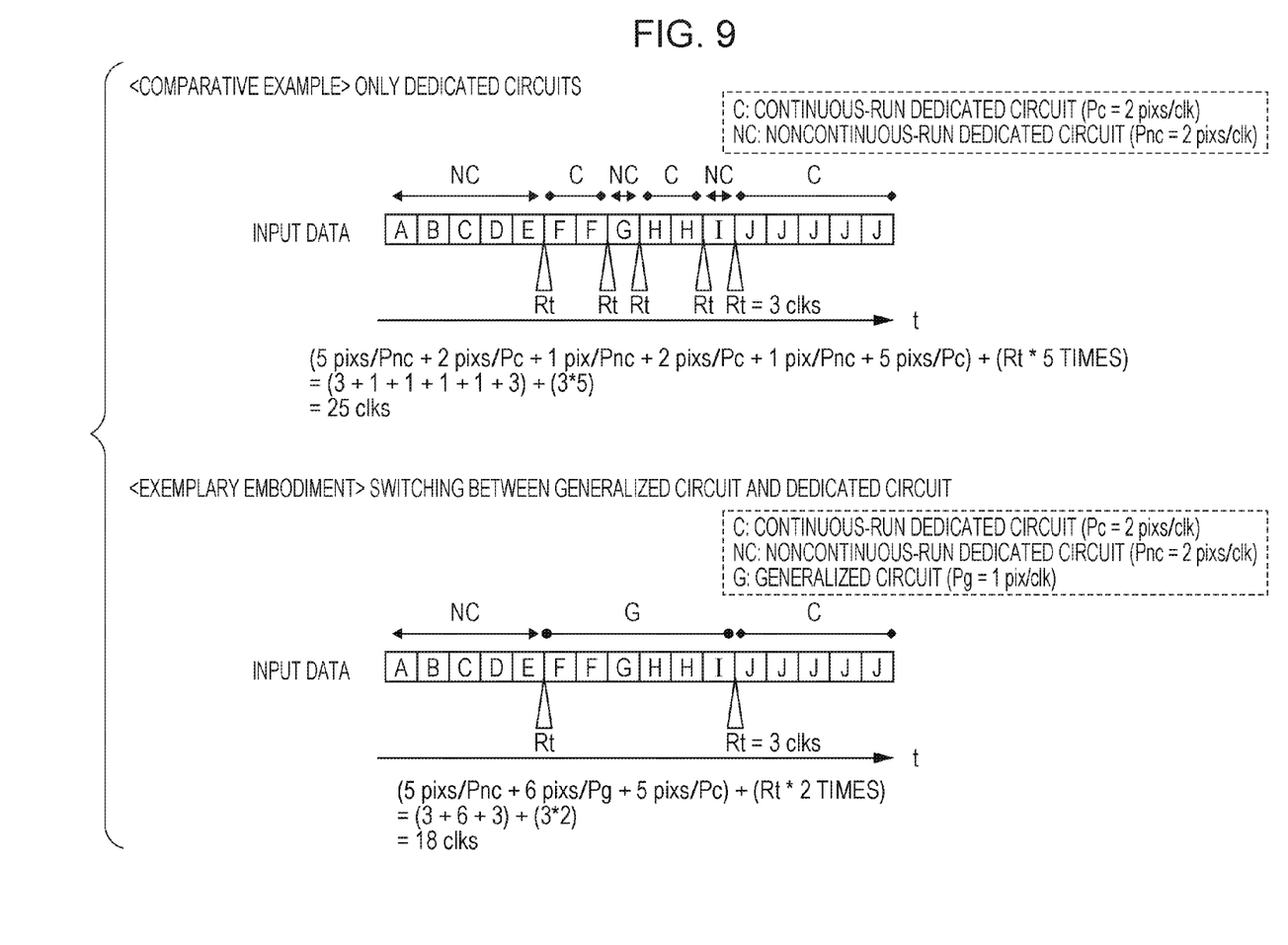
FIG. 9 is a diagram illustrating other specific examples of the dedicated circuit and the generalized circuit.

FIG. 9 is a diagram illustrating other specific examples of the dedicated circuit and the generalized circuit. FIG. 9 illustrates the specific examples of the dedicated circuit and the generalized circuit in a run length compression process.

In the specific examples in FIG. 9, a continuous-run dedicated circuit C and a noncontinuous-run dedicated circuit NC are illustrated as the dedicated circuits in the run length compression process.

The continuous-run dedicated circuit C is a dedicated circuit used in a case where identical pieces of data are continuously input as processing targets. In the specific examples in FIG. 9, the continuous-run dedicated circuit C has a throughput (processing speed) of Pc=2 pixs/clk and specifically is capable of processing two pixels (pixs) per clock.

The noncontinuous-run dedicated circuit NC is a dedicated circuit used in a case where input data as a processing target is noncontinuous (identical pieces of data are not continuously input). In the specific examples in FIG. 9, the noncontinuous-run dedicated circuit NC has a throughput (processing speed) of Pnc=2 pixs/clk and specifically is capable of processing two pixels (pixs) per clock.

In comparison with these dedicated circuits, the generalized circuit in the specific examples in FIG. 9 is a circuit capable of performing the data processing regardless of whether input data as a processing target is continuous or noncontinuous. The generalized circuit has a throughput (processing speed) of Pg=1 pix/clk and specifically is capable of processing one pixel (pix) per clock. The generalized circuit has a lower throughput (lower processing speed) than the dedicated circuit.

In the comparative example illustrated in FIG. 9, only the dedicated circuits are used to execute the run length compression process on the input data. In contrast in the exemplary embodiment illustrated in FIG. 9, the generalized circuit and the dedicated circuit are appropriately switched to execute the run length compression process on the input data. Note that the same input data is processed in the comparative example and the exemplary embodiment, and a time taken to perform switching between the circuits, that is, perform reconfiguration one time is Rt=3 clocks (clks).

In the comparative example in FIG. 9, only the dedicated circuits, that is, the continuous-run dedicated circuit C and the noncontinuous-run dedicated circuit NC are used. To process the input data illustrated in FIG. 9, performing the switching five times, that is, executing the reconfiguration process five times is needed. Accordingly in the comparative example in FIG. 9, a processing time of 25 clocks (clks) is needed to execute the run length compression process on the input data.

In contrast in the exemplary embodiment, the input data is analyzed before the run length compression process, and the generalized circuit or the dedicated circuit is selected to minimize the processing time on the basis of a judgment made using the arrangement of pieces of input data, the number of times the circuits are to be switched, that is, the number of times the reconfiguration process is to be executed, and the like. Accordingly in the exemplary embodiment illustrated in FIG. 9, only a processing time of 18 clocks (clks) is needed to execute the run length compression process on the input data, and faster processing than in the comparative example is achieved.

The exemplary embodiment of the invention has heretofore been described; however, the exemplary embodiment described above is an example in every respect and does not limit the scope of the invention. The invention includes various modifications without departing from the spirit of the invention.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A data processing apparatus comprising:
a circuit selector that makes a selection, in data processing in which a plurality of unit processes are each selected and repeated, from a generalized circuit that executes the plurality of unit processes and one of dedicated circuits that are each dedicated to a corresponding one of the unit processes, the selection being made repeatedly on a basis of a judgment made using continuous repeat counts each of which indicates how many times a corresponding one of the unit processes is continuously repeated; and
a data processor that selectively configures one of the generalized circuit and the dedicated circuit that corresponds to one of results serially obtained from the selection repeatedly made by the circuit selector, the data processor performing the data processing.

2. The data processing apparatus according to claim 1, wherein the circuit selector makes a comparison between the generalized circuit and the dedicated circuit in terms of data processing performance evaluated using the continuous repeat counts of the respective unit processes and selects one of the generalized circuit and the dedicated circuit.

3. The data processing apparatus according to claim 1, wherein the circuit selector selects one of the generalized circuit and the dedicated circuit that exhibits a data processing time shorter than a data processing time of the other, the data processing time being calculated by using the continuous repeat counts of the respective unit processes.

4. The data processing apparatus according to claim 2, wherein the circuit selector selects one of the generalized circuit and the dedicated circuit that exhibits a data processing time shorter than a data processing time of the other, the data processing time being calculated by using the continuous repeat counts of the respective unit processes.

5. The data processing apparatus according to claim 1, wherein in the data processing, the unit processes are each associated with a corresponding one of a plurality of processing commands, and a selection is repeatedly made to serially obtain the unit processes in accordance with the respective processing commands, and wherein before the data processing, the circuit selector analyzes the plurality of processing commands for the data processing and obtains each continuous repeat count by counting continuous repetitions of a corresponding one of the processing commands.

6. The data processing apparatus according to claim 2, wherein in the data processing, the unit processes are each associated with a corresponding one of a plurality of processing commands, and a selection is repeatedly made to serially obtain the unit processes in accordance with the respective processing commands, and wherein before the data processing, the circuit selector analyzes the plurality of processing commands for the data processing and obtains each continuous repeat count by counting continuous repetitions of a corresponding one of the processing commands.

7. The data processing apparatus according to claim 3, wherein in the data processing, the unit processes are each associated with a corresponding one of a plurality of processing commands, and a selection is repeatedly made to serially obtain the unit processes in accordance with the respective processing commands, and wherein before the data processing, the circuit selector analyzes the plurality of processing commands for the data processing and obtains each continuous repeat count by counting continuous repetitions of a corresponding one of the processing commands.

8. The data processing apparatus according to claim 4, wherein in the data processing, the unit processes are each associated with a corresponding one of a plurality of processing commands, and a selection is repeatedly made to serially obtain the unit processes in accordance with the respective processing commands, and wherein before the data processing, the circuit selector analyzes the plurality of processing commands for the data processing and obtains each continuous repeat count by counting continuous repetitions of a corresponding one of the processing commands.

9. A data processing apparatus comprising:

a circuit selector that makes a selection from a generalized circuit that executes a plurality of processes and one of dedicated circuits that are each dedicated to a corresponding one of the processes, the selection being made repeatedly on a basis of a judgment made using the number of times reconfiguration is needed during data processing; and a data processor that selectively configures one of the generalized circuit and the dedicated circuit that corresponds to one of results serially obtained from the selection repeatedly made by the circuit selector, the data processor performing the data processing.

10. A data processing method comprising:

making a selection, in data processing in which a plurality of unit processes are each selected and repeated, from a generalized circuit that executes the plurality of unit processes and one of dedicated circuits that are each dedicated to a corresponding one of the unit processes, the selection being made repeatedly on a basis of a judgment made using continuous repeat counts each of which indicates how many times a corresponding one of the unit processes is continuously repeated; and selectively configuring one of the generalized circuit and the dedicated circuit that corresponds to one of results serially obtained from the selection repeatedly made by the circuit selector and performing the data processing.

\* \* \* \* \*